March 2, 1937.  R. A. HETZER  2,072,206
WATER SEPARATING DEVICE
Filed May 3, 1935

FIG.-1

INVENTOR
RUSSELL A. HETZER
BY
ATTORNEYS

Patented Mar. 2, 1937

2,072,206

UNITED STATES PATENT OFFICE 2,072,206

WATER SEPARATING DEVICE

Russell A. Hetzer, Madeira, Ohio, assignor to The American Laundry Machinery Company, Norwood, Ohio, a corporation of Ohio Application May 3, 1935, Serial No. 19,689

2 Claims. (Cl. 210—51)

My invention relates to an apparatus for removing an electrically conductive liquid from a liquid having a greater specific gravity. More particularly it relates to apparatus for removing water from a solvent containing chlorine.

In dry cleaning systems in which a volatile solvent is utilized as the cleaning agent, it is the practice after the washing operation to renovate the solvent to remove the dirt and grease so that it may be reutilized in the treating process. During the washing operation, moisture in the fabric and from the atmosphere becomes entrained in the solvent and during the renovating process is vaporized and condensed. Irrespective of the solvent which is employed as the detergent, it is desirable to remove the water from the solvent before reutilizing it in the cleaning operation. This is particularly true when a solvent containing chlorine is employed, such as carbon tetrachloride, because carbon tetrachloride reacts with water to form hydrochloric acid which attacks and corrodes certain metal parts of the apparatus.

It is therefore an object of my invention to provide an improved apparatus for removing water from a solvent or detergent having a different specific gravity than water. Another object of my invention is to provide an improved apparatus by means of which a surface layer of water may be removed from a solvent containing chlorine. A further object of my invention is to provide an improved apparatus for removing water and any hydrochloric acid which is present from a solvent containing chlorine during the renovating process.

My invention will be better understood by reference to the accompanying drawing in which the single figure is a conventional illustration of a solvent renovating system, showing my improved means for removing water from the solvent.

The solvent renovating system illustrated in the drawing is similar to that disclosed in my copending application Ser. No. 11,175 filed on March 14, 1935, and comprises an evaporator 1 which may be heated by means of steam coils 2, a condenser 3 provided with cooling coils 4, and a storage tank 5. During the operation of the system used solvent from the treating vessel is passed to the still through the conduit 6 where it is evaporated. The distilled vapors are passed to the condenser 3 through conduit 7 and the condensate flows through the conduit 8 to the storage tank 5 from whence the solvent may be drawn through the conduit 9 for reuse in the treating operation. A suitable vent 10 to the atmosphere is also provided.

In accordance with my invention I have provided an improved apparatus for removing the water from the solvent. Solvents containing chlorine which are utilized in dry cleaning processes, such as carbon tetrachloride, trichlorethylene, perchlorethylene and ethylene dichloride, have a greater specific gravity than water and are immiscible therewith and, consequently, any water which is present in the solvent stratifies and forms a surface layer. There will of course be some hydrochloric acid dissolved in the water which is formed by the reaction of water and the solvent, and this is particularly true with respect to the water which is present in storage tank 5 because the water which is extracted from the fabric and the atmosphere reacts with the chlorine compound to the greatest extent when the vapors are being condensed to the liquid state. There will also be a small amount of water soluble metallic salts present which are formed by the reaction of hydrochloric acid and the metal parts of the condenser. The water which floats upon the surface of the solvent will therefore be electrically conductive.

As illustrated in the drawing, an insulated tube is supported inside of the storage tank 5 by means of a bracket 12. The insulated tube may be formed of glass, porcelain or a suitable molded composition, such as a phenolic condensation product or a molded composition in which a phenolic condensation product is utilized as the binder. Mounted inside of the insulating tube 11 is a pair of contacts or electrodes 13 and 14. The contacts or electrodes may be formed of any suitable conductive substance. I prefer, however, to utilize carbon contacts or electrodes which do not react with hydrochloric acid. The contacts may be affixed to the insulators by means of a conductive cement or if a molded composition is employed they may be formed in place during the molding operation. Contact 13 is connected to the line L2 by means of conductor 13a and contact 14 is connected to line L1 by means of conductor 15, solenoid 16 and conductor 17. The solenoid 16 controls the operation of valve 18 which, in turn, controls the flow of liquid in a conduit 19, one end of which is connected to storage tank 5 at such a point that the orifice of the conduit is in a horizontal plane with the contacts, or at a slightly higher plane, and the other end of which terminates in a vessel 20 which is provided with conduits 21 and 22 which are controlled by valves 23 and 24, respectively. As illustrated in the drawing, the conduit 19 which leads into the storage tank and the tube 11 are positioned at such a point that the water and hydrochloric acid which floats on the surface of the solvent may flow through the conduit 19 when the solvent reaches or falls to a predetermined level in the storage tank, but the solvent is prevented from flowing through the conduit.

The operation of my improved apparatus will now be apparent. During the condensation process when the solvent reaches such a level that the water and any hydrochloric acid which is present forms a conductor between contacts 13 and 14, a current will be established from line L1 through conductor 17, solenoid 16, conductor 15, contacts 14 and 13 and conductor 13a to line L2. Solenoid 16 will thus be energized, valve 18 will open, and the water floating on the surface of the solvent will flow into vessel 20 through conduit 19. When solvent in storage tank 5 rises above contacts 13 and 14, however, the current is broken because the solvent is not electrically conductive. As the level of liquid in the vessel falls, however, as when solvent is being drained from the tank, the water containing hydrochloric acid and metallic salts will again come in contact with the contacts or electrodes, a circuit will be established, and water will again flow from the tank.

The liquid flowing to the vessel 20 will be composed principally of water. A small amount of solvent, however, will be present which settles at the bottom of the vessel and may be removed at desired intervals through the conduit 22, or, if desired, the water may be drawn from the vessel through the conduit 21 when the liquid in the vessel attains the desired level.

While I have disclosed my invention as being applied to the removal of water from the storage tank of a renovating system, it will be understood that I do not desire to limit myself in this respect as my improved apparatus may be applied to any collecting receptacle forming part of or associated with a dry cleaning system or to storage tanks for the solvent. For instance, my apparatus may be applied to the sump tank or collecting vessel disclosed in my copending application to which reference has been made.

It will also be understood that my improved apparatus may be utilized for removing water from solvents having a lower specific gravity than water, such as benzine, in which case water soluble salts, acids or bases may be added, if necessary, to render the water conductive. Ordinary water of course contains sufficient salts in solution to render it conductive and when the term "water" is utilized in the claims it will be understood that such water contains sufficient salts, acids or bases to render it conductive.

From the foregoing specification it will be apparent that I have provided an improved apparatus by means of which water may be effectively and economically removed from solvents from which it stratifies.

It will also be apparent that my improved apparatus may be employed without interrupting the treating operation of the fabric or the renovation of the solvent and that the water may be effectively removed without the use of traps or other complicated appurtenances.

To those skilled in the art many modifications of and widely different embodiments and applications of my invention will suggest themselves without departing from the spirit and scope thereof. My disclosure and the description are purely illustrative and are not in any sense limiting.

What I claim is:

1. An apparatus for separating water from solvents having a greater specific gravity than water and from which the water will stratify comprising a vessel for holding the liquids in superimposed relationship, means for supplying solvent containing water to said vessel and means for draining solvent from the vessel including a vertical conduit extending from a position above the normal level of the liquid in the vessel to a point adjacent the bottom of the vessel and a horizontally extending conduit connected to the vertical conduit at a point a short distance above its lower orifice, a pair of spaced electrodes connected to a source of current, said electrodes being located a substantial distance above the bottom of the receptacle, whereby an electric circuit is established when the water rises or falls to such a position that it makes contact with the electrodes, a conduit leading from the vessel, the orifice of which is positioned in substantially the same horizontal plane as the electrodes, a valve for said conduit, and means responsive to the flow of current in said circuit for opening said valve whereby water may be drained from the surface of said solvent.

2. An apparatus for separating water from solvents having a greater specific gravity than water and from which the water stratifies, comprising a vessel for holding the liquids in superimposed relationship, means for supplying solvent containing water to said vessel whereby the level of the solvent and superimposed layer of water in the vessel will rise, means for draining solvent free from water from the vessel whereby the level of the solvent and the superimposed layer of water will fall in the vessel, a pair of spaced electrodes connected to a source of current, said electrodes being located a substantial distance above the bottom of the receptacle whereby an electrical circuit is established when the water rises or falls to such a position that it makes contact with the electrodes, a conduit leading from the vessel, the orifice of which is positioned in substantially the same horizontal plane as the electrodes, a valve for said conduit, and means responsive to the flow of current in said circuit for opening said valve whereby water may be drained from the surface of said solvent.

RUSSELL A. HETZER.